(12) United States Patent
Quesnel et al.

(10) Patent No.: US 10,137,366 B1
(45) Date of Patent: Nov. 27, 2018

(54) DUAL JOYSTICK CONTROLLER

(71) Applicants: Dan Quesnel, Gulf Breeze, FL (US);
Jesse Cofske, Gulf Breeze, FL (US)

(72) Inventors: Dan Quesnel, Gulf Breeze, FL (US);
Jesse Cofske, Gulf Breeze, FL (US)

( * ) Notice: Subject to any disclaimer, the term of this patent is extended or adjusted under 35 U.S.C. 154(b) by 0 days.

(21) Appl. No.: 15/828,907

(22) Filed: Dec. 1, 2017

(51) Int. Cl.
| | |
|---|---|
| *A63F 9/24* | (2006.01) |
| *A63F 13/00* | (2014.01) |
| *G06F 17/00* | (2006.01) |
| *G06F 19/00* | (2018.01) |
| *A63F 13/24* | (2014.01) |

(52) U.S. Cl.
CPC .................................. *A63F 13/24* (2014.09)

(58) Field of Classification Search
USPC ........... 463/1, 15, 17, 37, 38, 39, 40; 434/45
See application file for complete search history.

(56) References Cited

U.S. PATENT DOCUMENTS

| | | | | |
|---|---|---|---|---|
| 7,273,125 B2 * | 9/2007 | Schuh | ................... | B60K 17/10 |
| | | | | 180/305 |
| 8,576,170 B2 * | 11/2013 | Cordes | ................... | G06F 3/016 |
| | | | | 345/161 |
| 2008/0217075 A1 * | 9/2008 | Gordner | ................ | G06F 3/0234 |
| | | | | 178/18.01 |
| 2009/0269724 A1 * | 10/2009 | Thomas | ................... | G09B 9/08 |
| | | | | 434/45 |
| 2011/0306425 A1 * | 12/2011 | Rivard | .................. | A63F 13/285 |
| | | | | 463/37 |
| 2013/0154542 A1 * | 6/2013 | Joynes | .................. | H02J 7/0042 |
| | | | | 320/101 |

\* cited by examiner

*Primary Examiner* — Adetokunbo O Torimiro
(74) *Attorney, Agent, or Firm* — The Rapacke Law Group, P.A.

(57) ABSTRACT

A dual joystick system for operating a main electronic controller generally includes first and second joystick devices. Each comprises a casing configured to be gripped by a hand, at least one trigger switch configured to operable by a forefinger, a thumb activated switch on an upper end of the casing, a switch cluster on a side of the casing operable by a thumb, and at least one microprocessor configured to process signals from the switches and to communicate remotely with the main controller. The switch clusters may be located to the side of the respective casings, the orientation of each cluster may be adjustable, and at least one switch cluster may be a digital thumbstick. One or more bases may be configured to allow the first and second joystick devices to operate as analog joysticks. One base may have a separable joint that when separated forms two bases.

20 Claims, 4 Drawing Sheets

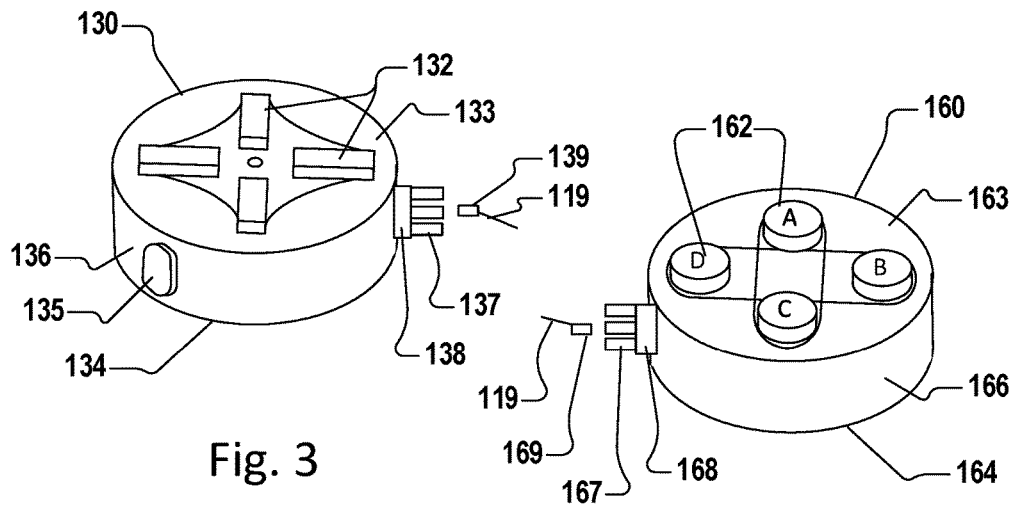
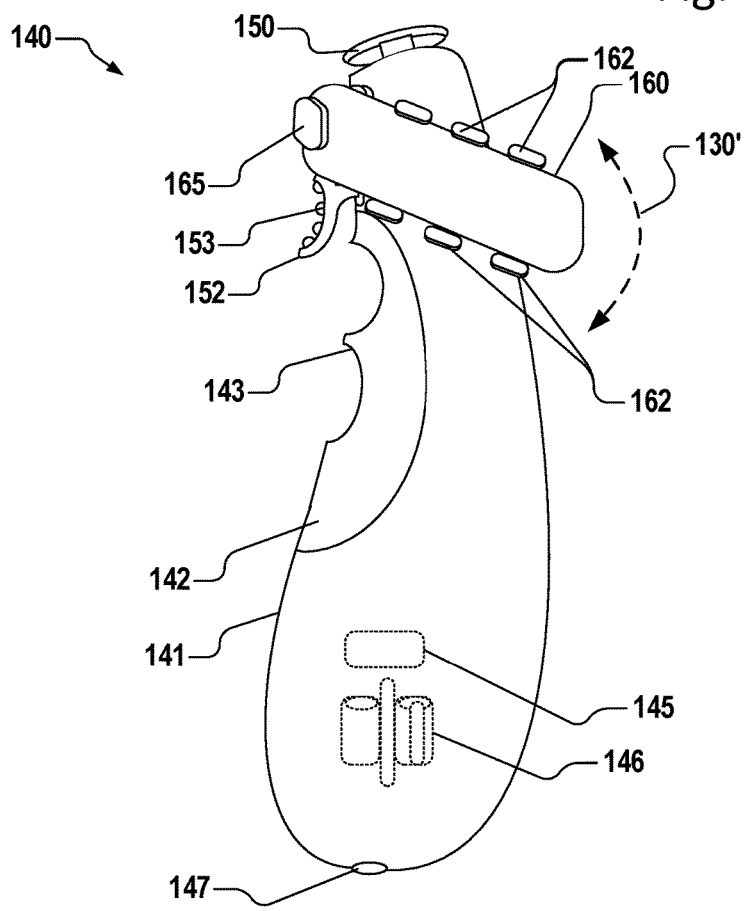
Fig. 3
Fig. 4
Fig. 5

DUAL JOYSTICK CONTROLLER

FIELD

The present disclosure relates to a device and system having a joystick, and more particularly to devices and systems having two joysticks that operate together to control an image processor.

BACKGROUND

This section provides background information related to the present disclosure which is not necessarily prior art.

With the proliferation of computerized gaming systems, manufacturers have introduced a variety of controllers intended to facilitate an increasingly complex array of functions.

There is need in the art for a handheld controller that is more ergonomic and allows the complexity of buttons and features to be more easily managed during use.

SUMMARY OF THE INVENTION

This section provides a general summary of the disclosure, and is not a comprehensive disclosure of its full scope or all of its features.

A dual joystick system for operating a main electronic controller generally includes first and second joystick devices. Each joystick device comprises a casing configured to be gripped by a hand, at least one trigger switch on the casing configured to operable by a forefinger, a thumb activated switch on an upper end of the casing, a switch cluster on a side of the casing operable by a thumb, and at least one microprocessor configured to process signals from the switches and to communicate remotely with the main controller.

The thumb activated switches on the joystick devices may be analog buttons or thumb sticks. The switch clusters on the joystick devices may be located on surfaces to the side of the respective casings, the orientation of each cluster may be adjustable with respect to the casing and the operator's thumb, and at least one switch cluster may be a digital thumbstick. The first joystick device may be configured to send directional signals from its switch cluster, and the second joystick may be configured to send action signals from its switch cluster, to the main electronic controller.

One or more bases may be configured to receive the bottom ends of the casings of the first and second joystick devices and to cooperate with those casings so the first and second joystick devices operate as analog joysticks. One base may have a separable joint that when separated forms two bases, such that a first base is paired with the first joystick device and a second base is paired with the second joystick device. A base platform may support the one or more bases.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

A more complete understanding of these embodiments, and the attendant advantages and features thereof, will be more readily understood by reference to the following detailed description when considered in conjunction with the accompanying drawings. The drawings described herein may not be to scale, are for illustrative purposes only of selected embodiments and not all possible implementations, and are not intended to limit the scope of the present disclosure.

For clarity and in order to emphasize certain features, not all of the drawings depict all of the features that might be included with the depicted embodiment. The invention also encompasses embodiments that combine features illustrated in multiple different drawings; embodiments that omit, modify, or replace some of the features depicted; and embodiments that include features not illustrated in the drawings. Therefore, it should be understood that there is no restrictive one-to-one correspondence between any given embodiment of the invention and any of the drawings.

FIG. 3 is a perspective view of a digital switch cluster.

FIG. 4 is a perspective view of a surface switch assembly.

FIG. 5 is right side view of a right-handed joystick device.

Corresponding reference numerals indicate corresponding parts throughout.

DETAILED DESCRIPTION

Any reference to "invention" within this document is a reference to an embodiment of a family of inventions, with no single embodiment including features that are necessarily included in all embodiments, unless otherwise stated. Furthermore, although there may be references to "advantages" provided by some embodiments, other embodiments may not include those same advantages, or may include different advantages. Any advantages described herein are not to be construed as limiting to any of the claims.

As used herein, relational terms, such as "first" and "second," "top" and "bottom," and the like, may be used solely to distinguish one entity or element from another entity or element without necessarily requiring or implying any physical or logical relationship or order between such entities or elements.

Specific quantities, dimensions, spatial characteristics, compositional characteristics and performance characteristics may be used explicitly or implicitly herein, but such specific quantities are presented as examples only and are approximate values unless otherwise indicated. Discussions and depictions pertaining to these, if present, are presented as examples only and do not limit the applicability of other characteristics, unless otherwise indicated.

In describing preferred and alternate embodiments of the technology described herein, specific terminology is employed for the sake of clarity. The technology described herein, however, is not intended to be limited to the specific terminology so selected, and it is to be understood that each specific element includes all technical equivalents that operate in a similar manner to accomplish similar functions.

Example embodiments will now be described more fully with reference to the accompanying drawings. Specific details are set forth such as examples of specific components and methods to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known device structures are not described in detail.

With reference to FIGS. 1-10, a dual joystick controller increases ease and freedom of use to allow its operator an advantage in performance. The present invention is more ergonomic than the prior art because all components are more comfortably spaced, allowing smooth range of movement. While not limited to video gaming, and while each joystick may be operable on its own, great improvement in gaming and multi-tasking is realized by joint operation of the two joysticks.

Figure 1:
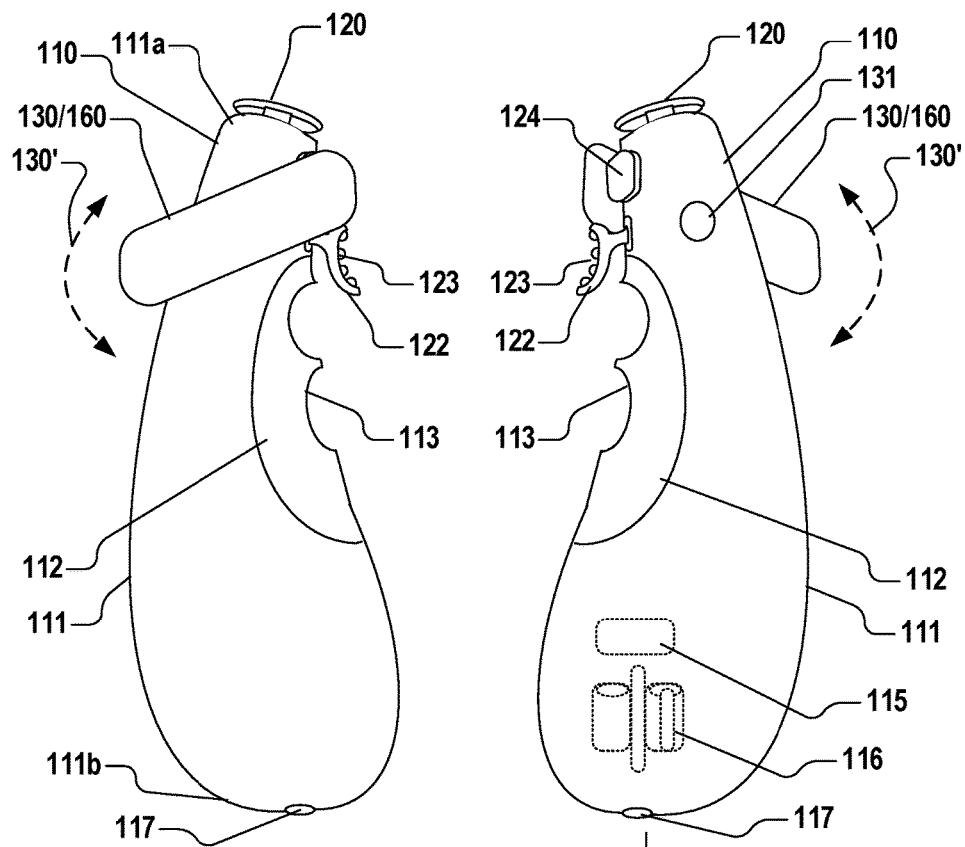
FIG. 1 is a left side view of a left-handed joystick device.
Figure 2:
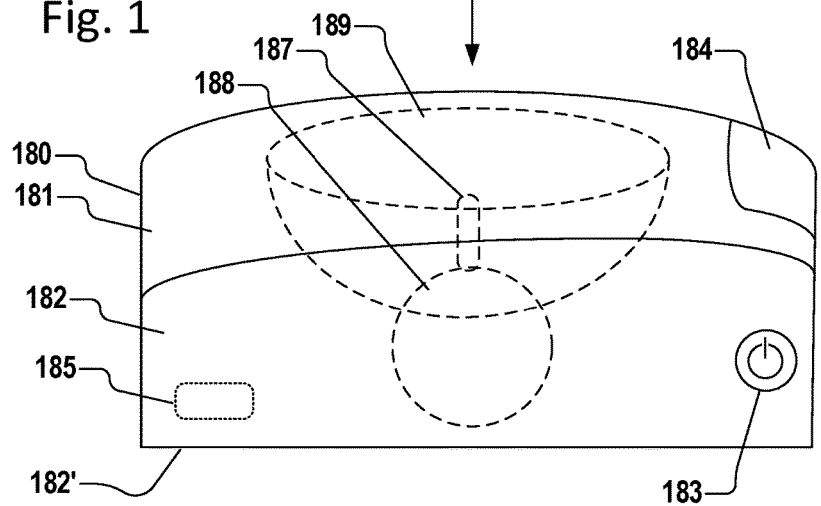
FIG. 2 is a right-side view of the joystick device of FIG. 1 with a base.

As illustrated in FIGS. 1-2, a left-handed joystick device 110 has an ergonomically formed casing 111 and grip 112 with finger notches 113, though the invention is not limited to the particular shape and ergonomic features as shown. At the casing's top end 111a is a thumb-activated switch 120 that may be a standard analog joystick button or thumbstick (thumb joystick). Above the finger notches 113 is a trigger switch 122 (with finger grip 123) and/or a trigger button 124. The joystick device 110 comprises electronics 115 necessary to make the joystick device 110 operable, including, but not limited to microprocessors, chips, wiring, sensors, switches, lights, ports, and wireless technology suitable for gaming devices, and may include a vibrator component 116 that allows the operator's hand to feel the vibration. The joystick device 110 communicates remotely with a main electronic controller (for example, a gaming system with graphic display).

As the operator grips the joystick device 110, the operator's thumb is also able to reach a switch cluster 130/160 on the body of the casing 111, typically on the side. The switch cluster 130/160 may resemble a puck or donut, and may be called a "pad." The switch cluster 130/160 may be rotated, swiveled, or otherwise adjusted 130' and releasably locked in order to accommodate an operator's hand size, shape, and playing style.

At the casing's bottom end 111b is a shaft aperture 117 that engages a shaft 187 and ball 188 of a joystick base 180, which comprises a semispherical cup 189 in its top surface 181 for receiving the joystick device 110 and supporting rotation and tilting of the joystick device 110. The base 180 may have other switches such as a power button 183 and touch pad 184 on its sides 182 or top surface 181. A microprocessor and/or other electronics 185 enhance or enable communication with the joystick device 110 and/or a video game machine. The present invention is not limited to determining joystick position using a ball 188. Further, the shaft 187 and shaft aperture 117, or a design having similar functionality, may be configured for releasable placement or permanent attachment. The joystick device 110 may function as a "virtual joystick" when separated from the base 180 and the video game machine utilizes the electronics 115 to monitor the joystick device's 110 position and motion.

The switch cluster 130/160, as shown in FIGS. 3-7, is described herein with both general and specific functions. Cluster 130 has a cylindrical shape with top surface 133 and bottom surface 134, both or either of which has a set of switches that may be directional switches 132. Four directional switches 132 together may comprise a digital thumbstick. The cluster's 130 side surface 136 may comprise one or more surface buttons 135, as well as an electrical connection 137 to the joystick device 110, said connection made through an adjustable connector 138 that allows positioning of the switch cluster 130 for use. A wire 119 with adapter 139 may interface with the cluster 130 to provide power and/or communication to other components in the dual joystick system.

Cluster 160 has a cylindrical shape with top surface 163 and bottom surface 164, both or either of which has a set of action switches 162. The cluster's 160 side surface 166 may comprise one or more surface buttons 165. As in FIG. 5, which is a right-handed configuration of a joystick device 140, surface button 165 may be a trigger button. The switch cluster 160 may also comprise an electrical connection 167 to the joystick device 110, said connection made through an adjustable connector 168 that allows positioning of the switch cluster 160 for use. A wire 119 with adapter 169 may interface with the cluster 169 to provide power and/or communications to other components of the dual joystick system.

FIG. 5 is a right-side view of a joystick device 140 configured for right hand use, with switch cluster 160 positioned to be reached by the operator's right thumb. Casing 141 is ergonomically shaped and comprises a grip 142 with finger notches 143, though the invention is not limited to the particular shape and ergonomic features as shown. At the casing's top end is a thumb-activated switch 150 that may be a standard analog joystick button or thumbstick. Above the finger notches 143 is a trigger switch 152 (with finger grip 153) and/or a trigger button (hidden behind the switch cluster 160). The joystick device 140 comprises electronics 145 necessary to make the joystick device 140 operable, including, but not limited to microprocessors, chips, wiring, sensors, switches, lights, ports, and wireless technology suitable for gaming devices, and may include a vibrator component 146 that allows the operator's hand to feel the vibration. Shaft aperture 147 allows pairing with a base 190.

Figures 6, 7:
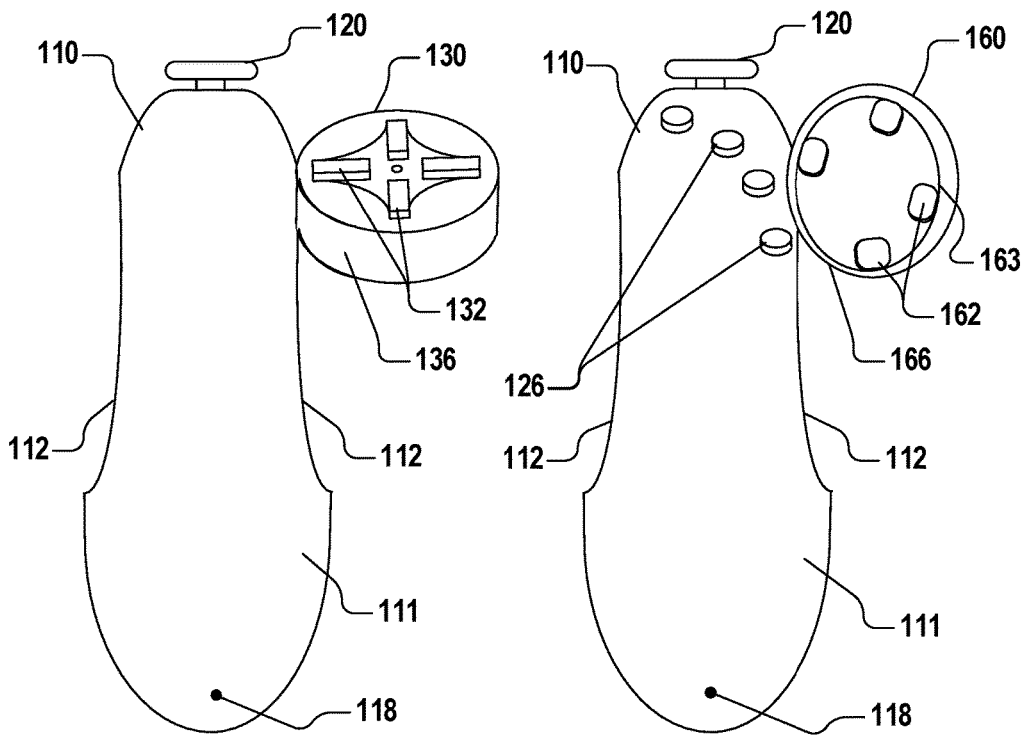
FIG. 6 is a rear view of a left-handed joystick device with digital switch cluster.
FIG. 7 is a rear view of a left-handed joystick device with a surface switch assembly.

FIGS. 6 and 7 are rear views of two configurations of joystick device 110. In FIG. 7, action switches 162 are placed on an inner/top surface 163 of a ring- or donut-shaped switch cluster 160. Also shown on the rear of the casing 111 are rear action switches 126, which may be of any number and are not limited to an arc pattern. Receptacle(s) 118 may receive adapter 139 with wire 119 as an option to wireless communication.

Figure 8:
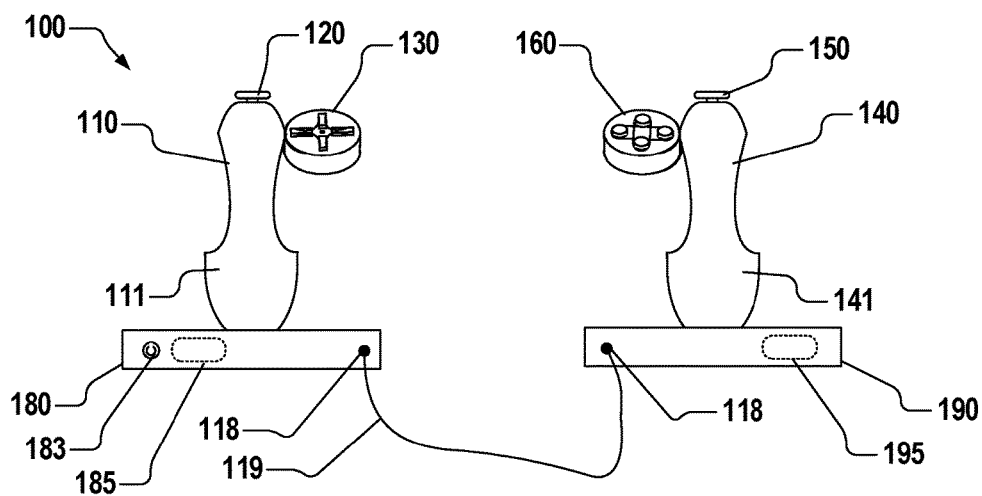
FIG. 8 is a rear view of a dual joystick device or system.
Figure 9:
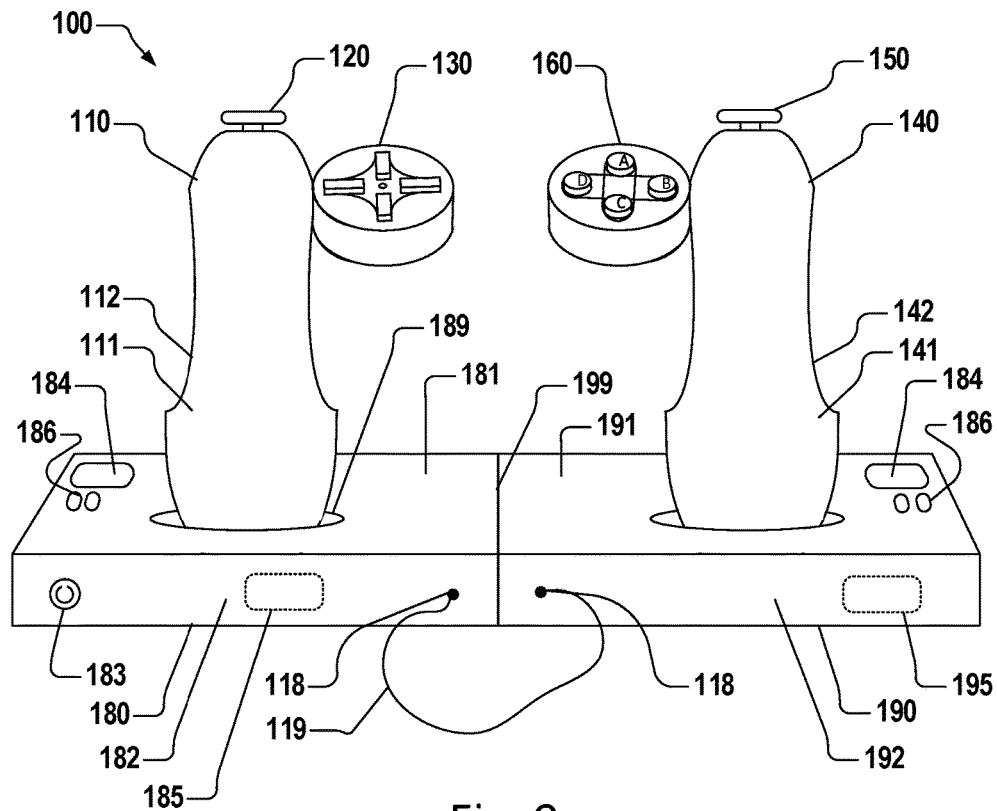
FIG. 9 is a rear view of a dual joystick device or system.
Figure 10:
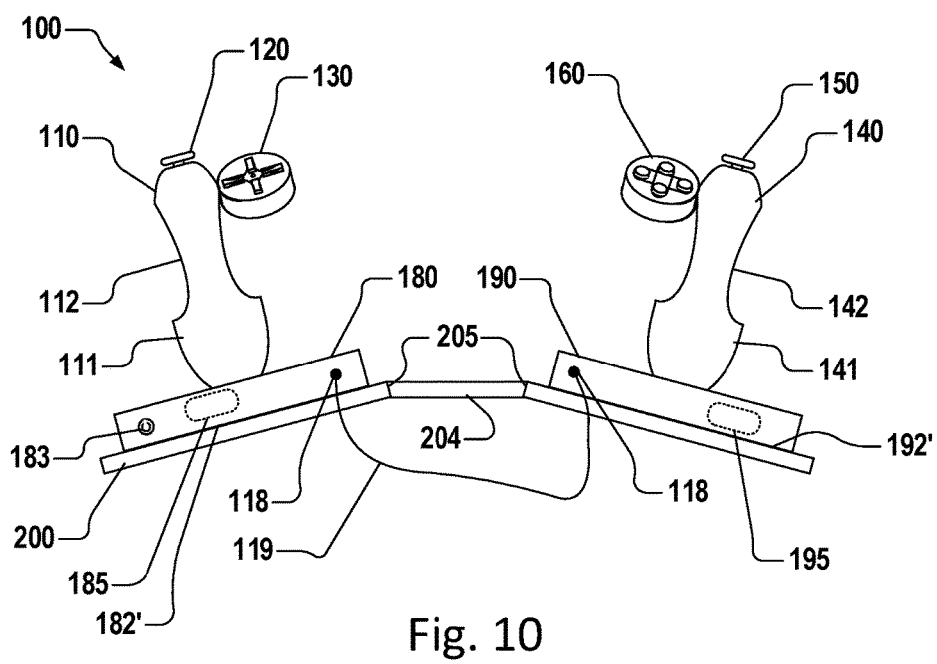
FIG. 10 is a rear view of the dual joystick devices or systems of FIGS. 8-9 on a platform.

FIGS. 8-10 illustrate a dual joystick device or system 100 wherein left and right joysticks 110/140 are in communication via wire 119 at receptacles 118 in their bases. The wire 119 is long enough to permit placement of the joysticks 110/140 a comfortable distance from each other. Microprocessors and other electronics 185 and 195 enable functionality, depending on how many microprocessors the manufacturer deems best for a particular functionality and cost. An expensive system 100 may comprise, for example, microprocessors and/or wireless capability in both joysticks 110, 140 and both bases 180, 190 for full operator customization. An economy version, on the other hand may comprise, for example one microprocessor and wireless capability in one base 180, wire 118, and joysticks 110, 140 permanently attached to their bases 180, 190.

In the preferred embodiment of FIG. 9, the bases 180 and 190 of the left and right joysticks 110/140 are joined at separable joint 199. Thus, the device or system 100 may share one base 180/190 or separable bases 180 and 190. Either or both bases 180/190 may have a power button 183, touchpad 184, and/or option buttons 186 on any top 181/191 or other side 182/192 of the base(s). FIG. 10 illustrates a base platform 200 utilized to separate but support the bottom sides 182', 192' of the bases 180, 190. The platform 200 includes a bendable center section 204 to allow the joysticks 110, 140 to be angled with respect to each other, as though the platform 200 is placed on the operator's legs. The bendable section 204 may include joints 205 such as corrugations or accordion folds, but is not limited to bending in such a fashion.

In practice, the operator will determine what system 100 functionality is necessary for a particular game and what configuration of joysticks 110/140, bases 180/190, wiring 119, and any base platform 200—and the physical proximity of each—is desirable for the operator's optimum performance.

As is obvious by now, for economy of manufacturing the same design may be utilized for the basic casing 111/141 and other components of the left-hand joystick device 110 and the right hand joystick device 140. For example, FIG. 2 shows a connecting port 131 for a switch cluster 130/160 that may be covered when not in use. Thus, although the components have different part numbers for clarity in this specification, it is understood that part numbers may be shared. For example, casing 111 may be casing 141, vibrator component 116 may be 146, and so on unless otherwise specified. In like fashion, switch clusters 130/160 may be interchangeable to either side of joystick casing 111/141. When the manufacturer determines desired functionality, the switches and buttons may be printed, molded, or otherwise formed with letters, numbers, and colors to indicate their functions.

In summary, a joystick system for operating a main electronic controller may comprise first and second joystick devices. Each joystick device may comprise a casing configured to be gripped by a hand, at least one trigger switch on the casing configured to operable by a forefinger, a thumb activated switch on an upper end of the casing, a switch cluster on a side of the casing configured to be operable by a thumb, and at least one microprocessor configured to process signals from the switches and to communicate remotely with the main electronic controller. The thumb activated switches on the first and second joystick devices may be analog buttons or thumbsticks. The switch clusters on the first and second joystick devices may be located on surfaces to the side of the respective casings, the orientation of each cluster may be adjustable with respect to the casing and the operator's thumb, and at least one switch cluster may be a digital thumbstick. The first joystick device may be configured to send directional signals from its switch cluster, and the second joystick may be configured to send action signals from its switch cluster, to the main electronic controller.

One or more bases may be configured to receive the bottom ends of the casings of the first and second joystick devices and to cooperate with those casings so the first and second joystick devices operate as analog joysticks. One base may have a separable joint that when separated forms two bases, such that a first base is paired with the first joystick device and a second base is paired with the second joystick device. Any or all bases may communicate via microprocessors and other electronics. A base platform may support the one or more bases.

One of skill in the art will understand that shapes, sizes, quantities, functions, and placement of specific buttons, triggers, switches, and the like—as well as the electronics within and connecting the components described—may be altered and still meet the functionality of the present invention, even if certain changes reduce cost or utilize technology other than that expressed herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A joystick system for operating a main electronic controller, the joystick system comprising:
    (a) a first joystick device comprising:
        (i) a casing configured to be gripped by a hand;
        (ii) at least one trigger switch on the casing configured to operable by a forefinger;
        (iii) a thumb activated switch on an upper end of the casing;
        (iv) a first switch cluster on a side of the casing configured to be operable by a thumb, the first switch cluster being arranged on an end face of a first cylindrical structure, the first cylindrical structure having a cylindrical edge wall attached adjacently to the casing; and
        (v) at least one microprocessor within the first joystick device configured to process signals from the switches on the first joystick device; and
    (b) a second joystick device comprising:
        (i) a casing configured to be gripped by a hand;
        (ii) at least one trigger switch on the casing configured to operable by a forefinger;
        (iii) a thumb activated switch on an upper end of the casing;
        (iv) a second switch cluster on a side of the casing configured to be operable by a thumb, the second switch cluster being arranged on an end face of a second cylindrical structure, the second cylindrical structure having a cylindrical edge wall attached adjacently to the casing; and
        (v) at least one microprocessor within the second joystick device configured to process signals from the switches on the second joystick device;
    wherein the first joystick device is in communication with the second joystick device; and wherein at least one of the joystick devices is configured to communicate remotely with the main electronic controller.

2. The joystick system of claim 1, wherein the thumb activated switches on the first and second joystick devices are analog buttons or thumb sticks.

3. The joystick system of claim 1, wherein the orientation of each cluster is adjustable with respect to the casing and the operator's thumb.

4. The joystick system of claim 1, wherein at least one switch cluster is configured to be a digital thumbstick.

5. The joystick system of claim 1, wherein the first joystick device is configured to send directional signals from its switch cluster, and the second joystick is configured to send action signals from its switch cluster, to the main electronic controller.

6. The joystick system of claim 1, further comprising one or more bases configured to receive the bottom ends of the casings of the first and second joystick devices and to cooperate with those casings so that each of the first and second joystick devices are pivotably connected to a base to operate as analog joysticks.

7. The joystick system of claim 6, wherein one base has a separable joint that when separated forms two bases, such that a first base is paired with the first joystick device and a second base is paired with the second joystick device.

8. The joystick system of claim 6, further comprising a base platform that supports the one or more bases.

9. The joystick system of claim 6, further comprising at least one microprocessor in communication with the microprocessors of the first and second joystick devices.

10. The joystick system of claim 1, wherein one of the joystick devices is configured to fit an operator's left hand and the other joystick device is configured to fit an operator's right hand.

11. A joystick system for operating a main electronic controller, the joystick system comprising:
(a) a first joystick device comprising:
   (i) a casing configured to be gripped by a left hand;
   (ii) at least one trigger switch on the casing configured to operable by a forefinger;
   (iii) a thumb activated switch on an upper end of the casing configured to be an analog button or thumb stick;
   (iv) a first switch cluster on a side of the casing configured to be a digital thumbstick, the first switch cluster being arranged on an end face of a first cylindrical structure, the first cylindrical structure having a cylindrical edge wall attached adjacently to the casing; and
   (v) at least one microprocessor within the first joystick device configured to process signals from the switches on the first joystick device;
(b) a second joystick device comprising:
   (i) a casing configured to be gripped by a right hand;
   (ii) at least one trigger switch on the casing configured to operable by a forefinger;
   (iii) a thumb activated switch on an upper end of the casing configured to be an analog button or thumb stick;
   (iv) a second switch cluster on a side of the casing configured to be operable by a thumb, the second switch cluster being arranged on an end face of a second cylindrical structure, the second cylindrical structure having a cylindrical edge wall attached adjacently to the casing; and
   (v) at least one microprocessor within the second joystick device configured to process signals from the switches on the second joystick device; and
(c) one or more bases comprising at least one microprocessor and configured to receive the bottom ends of the casings of the first and second joystick devices and to cooperate with those casings so the first and second joystick devices operate as an analog joysticks;
wherein the microprocessors are in communication with each other and at least one microprocessor is configured to communicate remotely with the main electronic controller.

12. The joystick system of claim 11, wherein the orientation of each cluster is adjustable with respect to the casing.

13. A joystick device for operating a remote main electronic controller, the joystick device comprising:
(a) a casing configured to be gripped by a hand;
(b) at least one trigger switch on the casing configured to be operable by a forefinger;
(c) a thumb activated switch on an upper end of the casing;
(d) a cluster of switches on a side of the casing configured to be operable by a thumb, the cluster of switches being arranged on an end face of a first cylindrical structure, the first cylindrical structure having a cylindrical edge wall attached adjacently to the casing; and
(e) at least one microprocessor within the joystick device configured to process signals from the switches and to communicate remotely with the main electronic controller.

14. The joystick device of claim 13, wherein the thumb activated switch is an analog button or thumb stick.

15. The joystick device of claim 13, wherein the orientation of the cluster of switches is adjustable with respect to the casing.

16. The joystick device of claim 13 configured to be a digital thumbstick.

17. The joystick device of claim 13, further comprising a base configured to receive a bottom end of the casing and to cooperate with the casing to operate as an analog joystick.

18. The joystick system of claim 1, wherein the first cluster of switches control direction and the second cluster of switches initiate actions.

19. The joystick system of claim 11, wherein the first cluster of switches control direction and the second cluster of switches initiate actions.

20. The joystick device of claim 13, wherein the cluster of switches one of control direction and initiate actions.

* * * * *